United States Patent
Penetrante et al.

(10) Patent No.: US 6,685,897 B1
(45) Date of Patent: *Feb. 3, 2004

(54) HIGHLY-BASIC LARGE-PORE ZEOLITE CATALYSTS FOR $NO_x$ REDUCTION AT LOW TEMPERATURES

(75) Inventors: Bernardino M. Penetrante, San Ramon, CA (US); Raymond M. Brusasco, Livermore, CA (US); Bernard T. Merritt, Livermore, CA (US); George E. Vogtlin, Fremont, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/478,576

(22) Filed: Jan. 6, 2000

(51) Int. Cl.[7] .............................................. B01D 53/92
(52) U.S. Cl. ............................... 423/213.2; 423/213.7; 423/239.1; 423/239.2; 423/DIG. 10
(58) Field of Search ..................... 423/239.2, DIG. 10, 423/213.7, 239.1, 213.2; 204/179

(56) References Cited

U.S. PATENT DOCUMENTS

| | | | |
|---|---|---|---|
| 3,926,780 A | 12/1975 | Ward | 208/111 |
| 4,153,429 A | 5/1979 | Matthews et al. | 55/68 |
| 4,867,954 A | 9/1989 | Staniulis et al. | 423/239 |

(List continued on next page.)

FOREIGN PATENT DOCUMENTS

| | | | | |
|---|---|---|---|---|
| DE | 3631950 A | 3/1988 | | |
| EP | 205813 A | 12/1986 | | |
| EP | 261610 A | 3/1988 | | |
| JP | 49-129695 A | * 12/1974 | ............. | 423/239.2 |
| JP | 3-101837 A | * 4/1991 | ............. | 423/239.2 |

(List continued on next page.)

OTHER PUBLICATIONS

Grant et al. *Grant and Hackh's Chemical Dictionary* (5th Ed.) McGraw–Hill Book Co., USA, ISBN 0-07-024067-1, p. 187,1987.*

Abstract of Papers, Part 1, 218th ACS National Meeting, 0-8412-3685-2, American Chemical Society, New Orleans, LA, Aug. 22-26, 1999, p. 1-4.

*Primary Examiner*—Stanley S. Silverman
*Assistant Examiner*—Timothy C. Vanoy
(74) *Attorney, Agent, or Firm*—Michael C. Staggs; Alan H. Thompson

(57) ABSTRACT

A high-surface-area (greater than 600 m2/g), large-pore (pore size diameter greater than 6.5 angstroms), basic zeolite having a structure such as an alkali metal cation-exchanged Y-zeolite is employed to convert $NO_x$ contained in an oxygen-rich engine exhaust to $N_2$ and $O_2$. Preferably, the invention relates to a two-stage method and apparatus for $NO_x$ reduction in an oxygen-rich engine exhaust such as diesel engine exhaust that includes a plasma oxidative stage and a selective reduction stage. The first stage employs a non-thermal plasma treatment of $NO_x$ gases in an oxygen-rich exhaust and is intended to convert NO to $NO_2$ in the presence of $O_2$ and added hydrocarbons. The second stage employs a lean-$NO_x$ catalyst including the basic zeolite at relatively low temperatures to convert such $NO_2$ to environmentally benign gases that include $N_2$, $CO_2$, and $H_2O$.

20 Claims, 4 Drawing Sheets

U.S. PATENT DOCUMENTS

| | | |
|---|---|---|
| 4,950,461 A | 8/1990 | Schwetje et al. ............ 423/239 |
| 4,961,917 A * | 10/1990 | Byrne ........................ 423/239 |
| 5,194,244 A | 3/1993 | Brownscombe et al. .... 423/700 |
| 5,369,070 A | 11/1994 | Descat et al. .................. 502/68 |
| 5,417,949 A | 5/1995 | McWilliams et al. ..... 423/239.2 |
| 5,536,483 A | 7/1996 | Descat et al. ............. 423/239.2 |
| 5,711,147 A * | 1/1998 | Vogtlin et al. ................. 60/274 |
| 5,849,255 A * | 12/1998 | Sawyer et al. ............ 423/213.5 |
| 5,879,645 A | 3/1999 | Park et al. ............... 423/213.2 |
| 5,891,409 A * | 4/1999 | Hsiao et al. ............. 423/239.1 |
| 5,893,267 A * | 4/1999 | Vogtlin et al. ................. 60/274 |
| 5,900,222 A | 5/1999 | Ito et al. .................. 423/239.2 |
| 6,038,854 A * | 3/2000 | Penetrante et al. ............ 60/297 |

FOREIGN PATENT DOCUMENTS

| | | | | |
|---|---|---|---|---|
| JP | 3131321 A | 6/1991 | | |
| JP | 5220351 A | 8/1993 | | |
| JP | 6-71141 A * | 3/1994 | | |
| JP | 6071141 A | 3/1994 | | |
| JP | 6071142 A | 3/1994 | | |
| JP | 6071143 A | 3/1994 | | |
| JP | 6071144 A | 3/1994 | | |
| JP | 6178940 A | 6/1994 | | |
| JP | 6-233915 A * | 8/1994 | .......... 423/DIG. 10 |
| JP | 6269673 A | 9/1994 | | |
| JP | 6343868 A | 12/1994 | | |
| JP | 7047232 A | 2/1995 | | |
| JP | 7047274 A | 2/1995 | | |
| JP | 7047276 A | 2/1995 | | |
| JP | 7047277 A | 2/1995 | | |
| JP | 7047278 A | 2/1995 | | |
| JP | 7112133 A | 5/1995 | | |
| JP | 7313843 A | 12/1995 | | |
| JP | 8323148 A | 12/1996 | | |

* cited by examiner

HIGHLY-BASIC LARGE-PORE ZEOLITE CATALYSTS FOR $NO_x$ REDUCTION AT LOW TEMPERATURES

United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to $NO_x$ reduction, more particularly to reduction of $NO_x$ by selective catalytic reduction technology including plasma-assisted catalytic reduction (PACR) technology, and more particularly to systems for chemically reducing $NO_x$ to $N_2$ and other benign gases in oxygen-rich environments.

2. Description of Related Art

The control of $NO_x$ emissions from vehicles is a worldwide environmental problem. Gasoline engine vehicles can use newly developed three-way catalysts to control such emissions, because their exhaust gases lack oxygen. But so-called "lean-burn" gas engines, and diesel engines too, have so much oxygen in their exhausts that conventional catalytic systems are effectively disabled. Lean-burn, high air-to-fuel ratio, engines are certain to become more important in meeting the mandated fuel economy requirements of next-generation vehicles. Fuel economy is improved since operating an engine stoichiometrically lean improves the combustion efficiency and power output. But excessive oxygen in lean-burn engine exhausts can inhibit $NO_x$ removal in conventional three-way catalytic converters. An effective and durable catalyst for controlling $NO_x$ emissions under net oxidizing conditions is also critical for diesel engines.

Catalysts that promote the reduction of $NO_x$ under oxygen-rich conditions are generally known as lean-$NO_x$ catalysts. Difficulty has been encountered in finding lean-$NO_x$ catalysts that have the activity, durability, and temperature window required to effectively remove $NO_x$ from the exhaust of lean-burn engines. Prior art lean-$NO_x$ catalysts are hydrothermally unstable. A noticeable loss of activity occurs after relatively little use, and even such catalysts only operate over very limited temperature ranges.

Such catalysts that can effectively reduce $NO_x$ to $N_2$ in oxygen-rich environments have been the subject of considerable research. (For instance, see, U.S. Pat. No. 5,208,205, issued May 4, 1993, to Subramanian, et al.) One alternative is to use catalysts that selectively reduce $NO_x$ in the presence of a reductant, e.g., selective catalytic reduction (SCR) using ammonia as a reductant.

However, another viable alternative that involves using co-existing hydrocarbons in the exhaust of mobile lean-burn gasoline or diesel engines as a reductant is a more practical, cost-effective, and environmentally sound approach. The search for effective and durable SCR catalysts that work with hydrocarbon reductants in oxygen-rich environments is a high-priority issue in emissions control and the subject of intense investigations by automobile and catalyst companies, and universities, throughout the world.

In the presence of hydrocarbons, catalysts that selectively promote the reduction of $NO_x$ under oxygen-rich conditions are known as lean-$NO_x$ catalysts, and more specifically—SCR lean-$NO_x$ catalysts. Selective catalytic reduction is based on the reaction of NO with hydrocarbon species activated on the catalyst surface and the subsequent reduction of $NO_x$ to $N_2$. More than fifty such SCR catalysts are conventionally known to exist. These include a wide assortment of catalysts, some containing base metals or precious metals that provide high activity. Unfortunately, just solving the problem of catalyst activity in an oxygen-rich environment is not enough for practical applications. Like most heterogeneous catalytic processes, the SCR process is susceptible to chemical and/or thermal deactivation. Many lean-$NO_x$ catalysts are too susceptible to high temperatures, water vapor and sulfur poisoning (from $SO_x$). Catalyst deactivation is accelerated by the presence of water vapor in the stream and water vapor suppresses the NO reduction activity even at lower temperatures. Also, sulfate formation at active catalyst sites and on catalyst support materials causes deactivation. Practical lean-$NO_x$ catalysts must overcome these problems simultaneously before they can be considered for commercial use.

Some hydrocarbons may be better reductants or better $NO_x$ to $N_2$ promoters. Many lean-$NO_x$ catalysts have been tested with propylene as the reductant. A disadvantage of such an embodiment is that two different supplies of hydrocarbons must be maintained aboard a diesel-powered vehicle. The preferred embodiment is the use of fuels, such as No. 1 or 2 diesel fuels, as reductants with the lean-$NO_x$ catalyst to reduce $NO_x$ and concurrently provide fuel for the upstream exhaust-generating engine. Thus, only one uncombusted source of hydrocarbons needs to be maintained aboard the vehicle. Most of the lean-$NO_x$ catalysts that have been shown to be efficient with propylene as reductant are not efficient when used with the heavy hydrocarbons present in diesel fuel. There is a great need to find a lean-$NO_x$ catalyst that can reduce $NO_x$ efficiently using heavy hydrocarbons similar to those present in diesel fuel.

The U.S. Federal Test Procedure for cold starting gasoline fueled vehicles presents a big challenge for lean-$NO_x$ catalysts due to the low-temperature operation involved. Diesel passenger car applications are similarly challenged by the driving cycle that simulates slow-moving traffic. Both tests require reductions of CO, hydrocarbons, and $NO_x$ at temperatures at or below 200° C. when located in the underfloor position. Modifications of existing catalyst oxidation technology are successfully being used to address the problem of CO and hydrocarbon emissions, but a need still exists for improved $NO_x$ removal.

SUMMARY OF THE INVENTION

The present invention provides a method for reducing $NO_x$ emissions and a vehicle with reduced $NO_x$ emissions. The present invention also provides a system for attachment to an engine with an oxygen rich exhaust for the reduction of $NO_x$ emissions.

Briefly, in a lean $NO_x$ selective catalytic reduction system of the present invention, $NO_x$ (usually in the form of NO and preferably $NO_2$) is reacted on a high-surface-area, large-pore, basic catalyst, such as an alkali metal-exchanged X-zeolite or Y-zeolite, and converted to environmentally benign products. The invention preferably comprises a nonthermal plasma gas treatment of exhaust NO to produce $NO_2$ which is then combined with the selective catalytic reduction treatment, e.g., a SCR lean $NO_x$ catalyst, to enhance $NO_x$ reduction in oxygen-rich vehicle engine exhausts. An engine controller can continually or periodically run brief fuel-rich conditions that provide hydrocarbon reductants for a reaction that catalyzes the $NO_2$ (produced by a plasma)

into benign products such as $N_2$. By using a plasma, the SCR lean $NO_x$ catalyst may contain less or essentially no precious metals, such as Pt, Pd and Rh, for reduction of the $NO_2$ to $N_2$.

Accordingly, an advantage of the present invention is that a method for $NO_x$ emission reduction is provided that is inexpensive and efficient. The plasma-assisted lean-$NO_x$/basic zeolite catalyst system can not only remove the dependence on precious metal lean-$NO_x$ catalysts, but allows for relatively more efficient compliance with $NO_x$ emission reduction laws.

Furthermore, not only does the plasma-assisted lean $NO_x$/basic zeolite catalyzed process improve the activity, durability, and temperature window of SCR/lean-$NO_x$ catalysis, but it also allows the combustion of fuels containing relatively high sulfur contents with a concomitant reduction of $NO_x$, particularly in an oxygen-rich vehicular environment. The present invention allows the use of a lean $NO_x$ catalyst to reduce $NO_x$ emissions in engine exhausts containing relatively high concentrations of sulfur, such as greater than 20 ppmw sulfur (calculated as S).

Still another advantage of the present invention is that an efficient method for $NO_x$ emissions reduction at relatively low temperatures is provided using heavy hydrocarbons as the reductant.

DETAILED DESCRIPTION OF THE INVENTION

In the present invention a basic catalyst containing or consisting essentially of an alkali-metal-exchanged, high-surface-area, large-pore, faujasite-type zeolite, is employed to convert $NO_x$ contained in an oxygen-rich engine exhaust to $N_2$. Preferably, the invention relates to a two-stage method for $NO_x$ reduction in an oxygen-rich engine exhaust that comprises a plasma oxidative stage and a selective reduction stage. The first stage employs a non-thermal plasma treatment of $NO_x$ gases in an oxygen-rich exhaust and is intended to convert NO to $NO_2$ in the presence of $O_2$ and hydrocarbons. The second stage employs a lean $NO_x$ catalyst usually comprising a basic faujasite-type zeolite at relatively low temperatures to convert such $NO_2$ to environmentally benign gases that include $N_2$, $CO_2$, and $H_2O$. By preconverting NO to $NO_2$ in the first stage with a plasma, the efficiency of the second stage for $NO_x$ reduction is enhanced. For example, an internal combustion engine exhaust is connected by a pipe to a first chamber in which a non-thermal plasma converts NO to $NO_2$ in the presence of $O_2$ and hydrocarbons, such as diesel fuel, kerosene or propylene. A flow of such hydrocarbons ($C_xH_y$) is input from usually a second pipe into at least a portion of the first chamber (optionally on an intermittent basis). The $NO_2$ from the plasma treatment proceeds to a second chamber to contact a preferred alkali-metal-exchanged Y-zeolite lean $NO_x$ selective reduction catalyst that converts $NO_2$ to $N_2$, $CO_2$, and $H_2O$. The hydrocarbons and $NO_x$ are simultaneously reduced while passing through the lean-$NO_x$ selective reduction catalyst. The method allows for enhanced $NO_x$ reduction in vehicular engine exhausts, particularly those having relatively high sulfur contents. More specific embodiments are discussed below.

Figure 1:
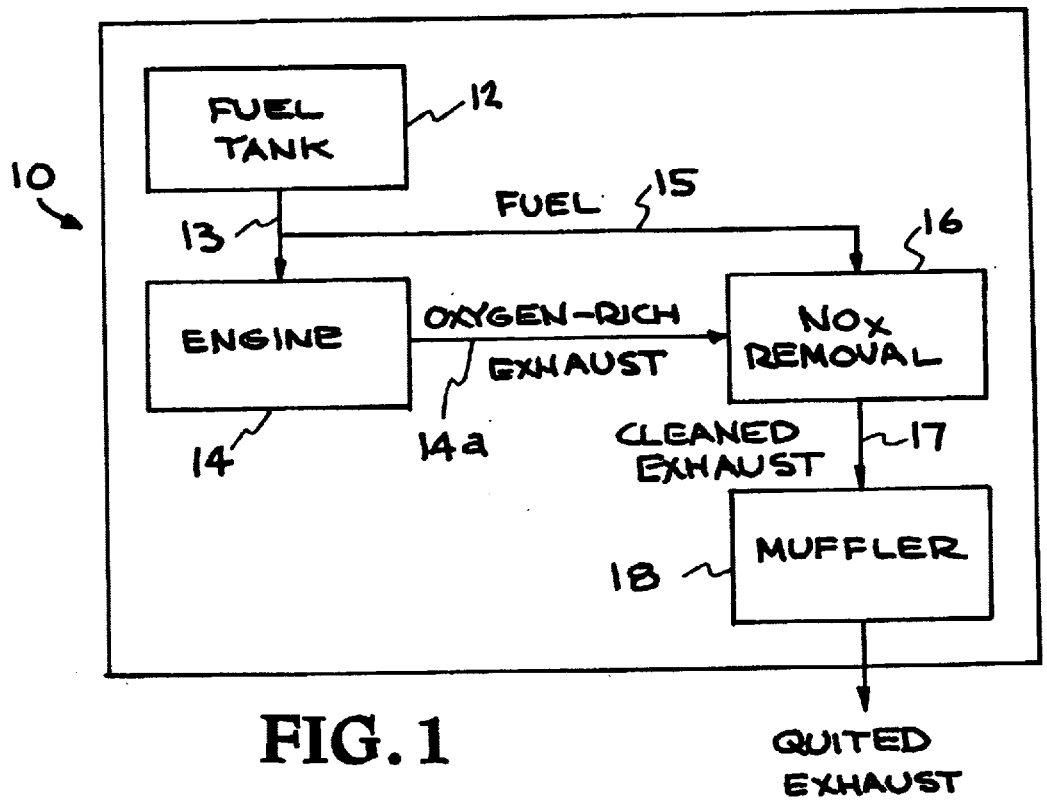
FIG. 1 is a block diagram of a vehicle embodiment of the invention.

FIG. 1 illustrates a vehicle embodiment of the present invention, and is referred to herein by the general reference numeral 10. The vehicle 10 is provided with a fuel tank 12 that supplies an internal combustion engine 14 and a $NO_x$ reduction unit 16 via fuel tank outlet line 13. The fuel used may be #2 diesel oil and the engine 14 may be a diesel type-common to busses and trucks. The engine 14 has an output of exhaust gas that is both rich in oxygen and oxides of nitrogen ($NO_x$), e.g., NO and $NO_2$. Oxygen-rich exhausts are typical of diesel engines and lean-burn gasoline engines. Such $NO_x$ in the exhaust is environmentally undesirable. The exhaust and a hydrocarbon such as unused fuel from fuel tank 12, are input to the $NO_x$ reduction unit 16 via exhaust outlet 14a and fuel tank bleed line 15, respectively. Hydrocarbons in the fuel and a selective catalytic reduction (SCR) system containing a high-surface-area, large-pore, basic catalyst, such as an alkali metal-exchanged X-zeolite or Y-zeolite, are used in a one-step conversion of hydrocarbons + $NO_x \rightarrow N_2$, $CO_2$ and $H_2O$ by the $NO_x$ reduction unit 16. A muffler 18 may optionally be used to quiet the otherwise noisy cleaned exhaust produced in $NO_x$ reduction unit 16 via optional exhaust outlet 17. An oxidative system (not shown), which is usually catalytic, can be employed to oxidize and remove unused hydrocarbon (diesel fuel) from $NO_x$ reduction unit 16 prior to final exhaust emission from the vehicle.

Figure 2:
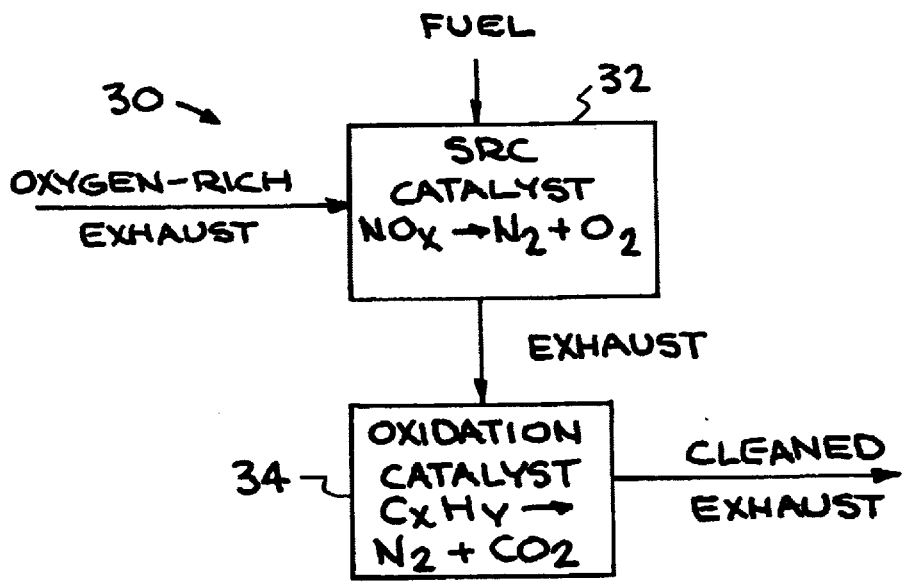
FIG. 2 is a flow chart of the method of the invention.

FIG. 2 illustrates a method embodiment (shown generally as 30) of the present invention for $NO_x$ removal in oxygen-rich exhaust flows. The $NO_x$ reduction unit 16 of FIG. 1 represents an implementation of method 30. A step 32 converts the $NO_x$ in an oxygen-rich exhaust flow to $N_2$ by mixing hydrocarbon molecules (e.g., engine fuel) into the oxygen-rich exhaust flow and passing the (normally vaporous) mixture through or over the basic zeolite-containing SCR catalyst. Exemplary large pore zeolites have relatively large pore volumes greater than about 0.20 ml/gram and preferably greater than about 0.30 ml/gram, relatively large pore sizes greater than 5 angstroms and a silicon/aluminum ratio from about 1.0 to about 3.0, with an Si/Al ratio of above about 1.5 to about 3.0 being highly preferred. Exemplary large pore zeolites include L-zeolite, Omega zeolite, ZSM-3, and X and Y zeolite. Although any SCR catalyst having a basic nature and a zeolite having a pore size diameter of at least 6.5 angstroms and preferably at least 7.5 angstroms, and/or a surface area from about 600 to about 1000 m²/g can be employed, catalysts containing, for instance, a basic faujasite-type zeolite, including all forms of alkali-metal-exchanged X-zeolites and Y-zeolites, are preferred. The zeolite preferably should have a large number of exchangeable cations of which at least 90 percent are alkali metal ions selected from the group consisting of lithium, sodium, potassium, rubidium and cesium. It is highly preferred that the SCR catalyst, i.e., a $NO_x$ reducing catalyst, contain essentially no supported metals deposited onto the zeolite supports; however, if such supported metals are employed, it is particularly preferred that such metals be a relatively inexpensive, non-noble metal such as copper, nickel, tin and the like, rather than expensive platinum, palladium or rhodium.

Furthermore, complex hydrocarbons and mixtures of hydrocarbons, such as diesel fuel, can optionally be reduced to simpler hydrocarbon molecules by cracking the complex hydrocarbon molecules with a plasma processor or other cracking means. In a subsequent step 34, an oxidizing catalyst, typically any conventional oxidizing catalyst, is used to convert the unused hydrocarbons and $O_2$ to more benign products such as $CO_2$.

Alternatively, a simple hydrocarbon may be supplied to the $NO_x$ reduction unit 16. Some hydrocarbons may be better reductants or better $NO_x$ to $N_2$ promoters. A disadvantage of such an embodiment is that two different supplies of hydrocarbons must be maintained aboard the vehicle 10. An advantage of a preferred embodiment of the present invention is that fuels, such as No. 1 or 2 diesel fuels, can serve as reductants with the basic, large pore zeolite SCR catalyst to reduce $NO_x$ and concurrently provide fuel for the upstream exhaust-generating engine. Thus, only one uncombusted source of hydrocarbons can be maintained aboard the vehicle. Nevertheless, other hydrocarbons which may be used, at least in part, as a reductant with the basic zeolite SCR catalyst include kerosene, propane, propylene, cracked No. 1 diesel fuel, and cracked No. 2 diesel fuel. Since a preferred embodiment of the invention relates to $NO_x$ reduction in industrial diesel fuel-burning engines, stationary or in vehicles, where diesel fuel No. 2 is combusted, a highly preferred hydrocarbon reductant added to the $NO_x$-polluted exhaust is No. 2 diesel fuel.

Figure 3:
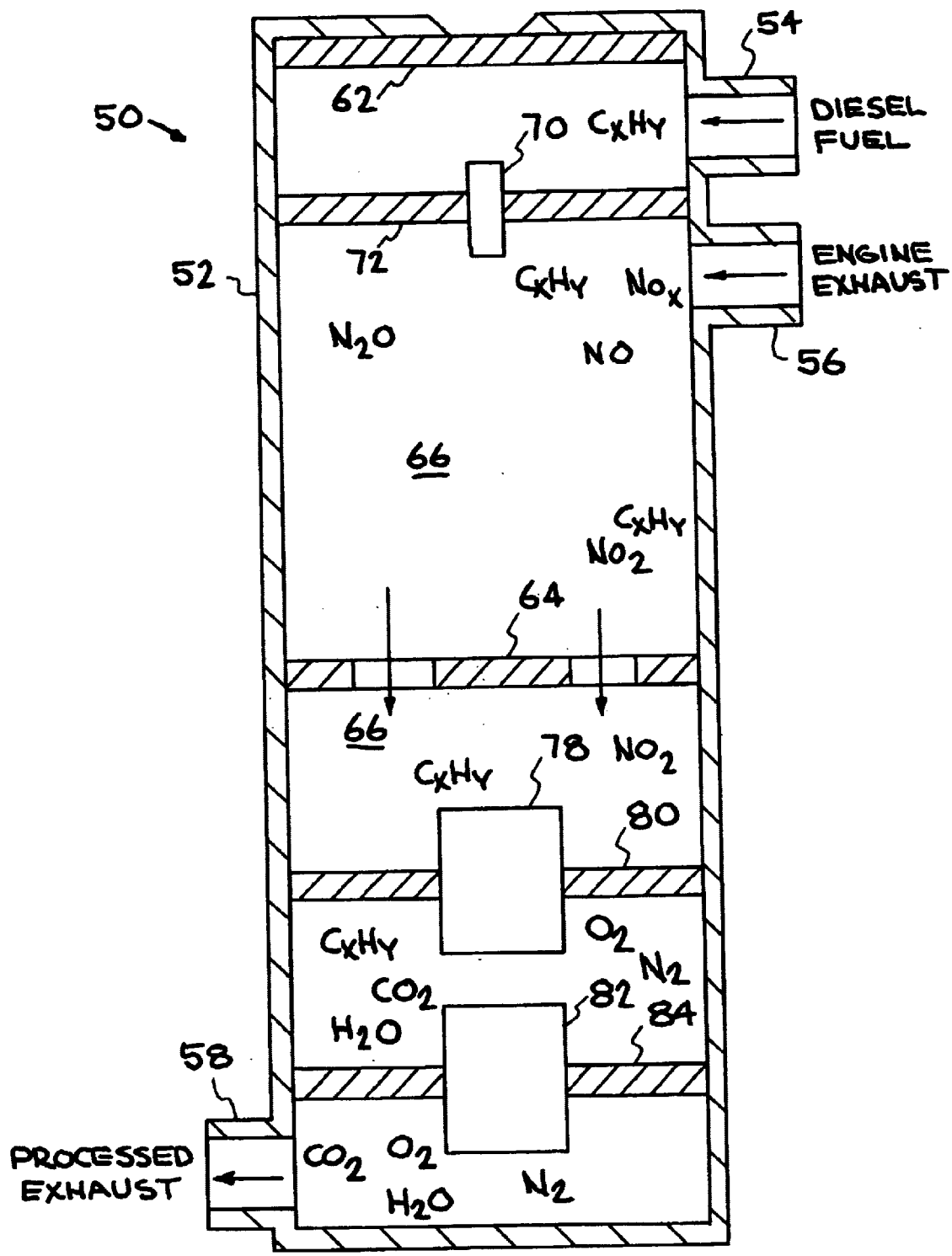
FIG. 3 is a cross sectional diagram representing a $NO_x$ reduction unit of the invention.

FIG. 3 illustrates a $NO_x$ reduction unit (shown generally as 50) of the present invention. The $NO_x$ reduction unit 50 is similar to the $NO_x$ reduction unit 16 of FIG. 1 and similar in operation to the $NO_x$ reduction method 30 of FIG. 2. The $NO_x$ reduction unit 50 comprises a cylindrical housing 52 including an adjacent insulative bulkhead 62 and with an atomized hydrocarbon inlet 54, an engine exhaust inlet 56 and a processed exhaust outlet 58. The housing 52 need not be cylindrical and can take the form of an exhaust manifold attached to an engine. The temperature on the catalyst can be optimized by adjusting the proximity of the $NO_x$ reduction unit 50 to the engine. The catalyst temperature should be less than 400 degrees C., more particularly less than 260 degrees C. and most preferably in the range from about 175 degrees C. to about 225 degrees C.

The exhaust and hydrocarbons are mixed in a chamber 66 between an insulative bulkhead 72, which separates inlets 54 and 56, and insulative bulkhead 80 on which a catalytic converter 78 is mounted. The exhaust and hydrocarbon parameters may be made independently variable and microcomputer controlled to accommodate a variety of exhaust flow rates being processed. Another parameter—temperature—is a feature of the invention. The mixture of added hydrocarbons (particularly additive diesel fuel) is passed over or through catalytic converter 78 at temperatures normally less than 400 degrees C., more particularly less than 260 degrees C. and most preferably in the range from about 175 degrees C. to about 225 degrees C., normally within the boiling temperatures of the reductant hydrocarbons, e.g., diesel fuel. In a preferred embodiment, hydrocarbons in a concentration above about 1000 ppm C1 (where C1 refers to a carbon atom) of the exhaust are added to the exhaust and passed over the basic zeolite SCR catalyst at a temperature less than about 225 degrees C.

Optionally, a preprocessor 70 is constructed as a concentric metal tube that pierces the bulkhead 72. The preprocessor 70 can crack the complex hydrocarbons provided from the inlet 54 into simpler hydrocarbons using, for instance, a non-thermal plasma, such as that disclosed in U.S. Pat. No. 5,711,147, issued to Vogtlin et al, the disclosure of which is incorporated by reference herein in its entirety. Furthermore, both the hydrocarbons and a non-thermal plasma from a plasma converter (not shown) can be mixed in chamber 66 and used to convert NO in the flow from the engine exhaust inlet 56 into $NO_2$. Optionally, porous bulkhead 64 can be positioned within chamber 66 to concentrate $NO_2$ with the hydrocarbons in the area of the catalyst surface of catalytic converter 78.

However, in the principal thrust of the invention, catalytic converter 78, mounted on bulkhead 80, provides for the selective catalytic reduction of the exhaust $NO_x$ (predominantly $NO_2$ if the $NO_x$ reduction is plasma-assisted or otherwise) to more environmentally benign molecules, such as $N_2$, $CO_2$ and $H_2O$, using the added hydrocarbon reductant mixed with the exhaust in chamber 66. Oxygen also enhances the selective catalytic reduction of NO by hydrocarbons.

In general, catalysts having a high-surface-area, large-pore, basic zeolite surface and/or framework structure having a pore size of about 7.5 angstroms in diameter are utilized in the invention; however, any basic SCR catalyst, i.e., a basic surfaced zeolitic lean-$NO_x$ catalyst, can be employed in the catalytic converter. The catalytic converter 78 may preferably be configured as a bed of alkali-metal-exchanged Y-zeolite. The catalytic converter 78 may also be configured as a wash coat of alkali-metal-exchanged Y-zeolite on a substrate. The term "alkali metal" is used as a descriptor of the elements of Group IA of the Periodic Table of the Elements (lithium, sodium, potassium, rubidium, cesium).

An oxidative -system, usually an oxidation catalyst 82 can be mounted on a bulkhead 84 and provides for the burning of any excess (unused) hydrocarbons not consumed by the catalytic converter 78. Preferably, the flow of hydrocarbons into the inlet 54 is controlled to minimize such excess hydrocarbons that must be burned by the oxidation catalyst 82.

Conventional catalysts that are active in selective catalytic reduction of NO by hydrocarbons usually have surface acidity, e.g., they possess surface hydroxyl groups. The simplest surface on which prior art selective catalytic reduction by hydrocarbons is observed is, for example, the amorphous, acidic form of alumina, known as $\gamma$-$Al_2O_3$. In contrast to such useful prior art SCR catalysts, the present invention surprisingly employs the basic zeolite having a much higher surface area, large pore structure and a basic nature. The term "basic", as it is associated with the zeolites, refers to having the characteristic of a base; e.g., when placed in a solution, a basic material will have a pH consistent with a base rather than an acid and, if a catalyst, will catalyze chemical reactions that are catalyzed by bases.

The basic property can be prepared by having a large number of exchangeable cations of which at least 90 percent are alkali metal ions selected from the group consisting of lithium, sodium, potassium, rubidium and cesium. Alkali metal cation exchanged zeolites are particularly suitable for the adsorption of acidic gases and for the catalysis of base-catalyzed reactions. The basic strength increases as the aluminum content of the aluminosilicate framework structure of the zeolite increases. The basic strength also increases as the cation size goes up in the alkali metal ion series. The basicity may be increased further by preparing a composition according to U.S. Pat. No. 5,194,244, the disclosure of which is incorporated by reference herein in its entirety, wherein the sum of the amount of the alkali metal in the compounds plus any alkali metal cation exchanged into the zeolite is in excess of that required to provide a fully alkali metal cation exhanged zeolite. Highly effective catalysts include such alkali metal catalysts having the above-described relatively large pore sizes and relatively large pore volumes, particularly catalysts having the large pore faujasite-type zeolites.

Figure 4:
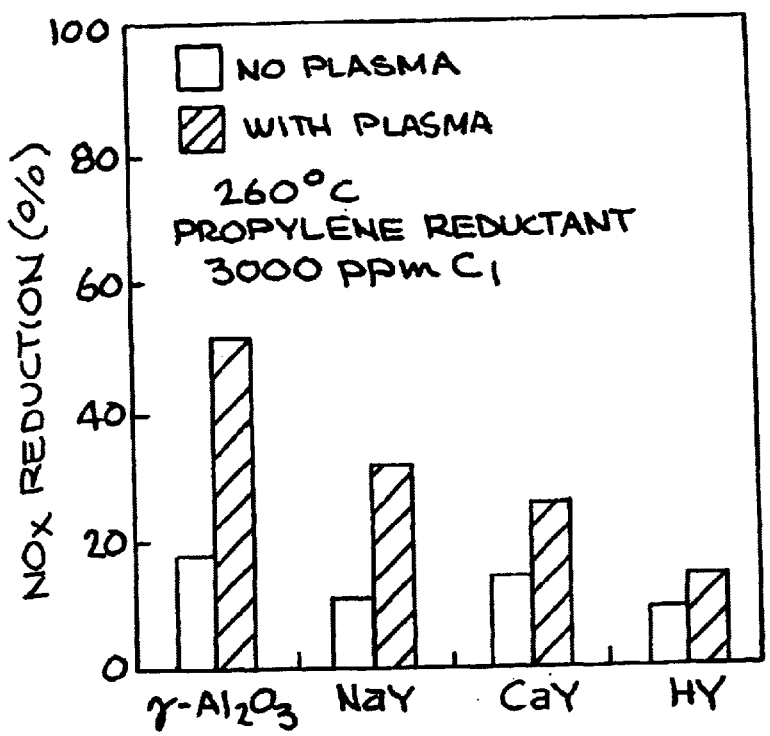
FIG. 4 is a bar graph illustrating the percentage of $NO_x$ reduction in a diesel engine exhaust by catalysts containing gamma-alumina, sodium Y-zeolite, calcium Y-zeolite or hydrogen Y-zeolite and hydrocarbon addition to the exhaust at 260 degrees C., with and without plasma assistance.

In FIG. 4, at incoming exhaust temperatures of 260 degrees C. to a catalytic converter, the percentage of total $NO_x$ reduction in an exhaust from a diesel engine is compared in the presence of four different SCR lean-$NO_x$ catalysts, using an additional portion of proplyene as the reductant. The catalysts contain pellets of pure $\gamma$-$Al_2O_3$, pellets of Y-zeolites, including sodium Y-zeolite, calcium Y-zeolite, and hydrogen Y-zeolite. The $NO_x$ reduction is attributed the combination of additive hydrocarbon (proplyene) concentration and the activity of the catalyst. The concentrations of NO and $NO_2$ ($NO_x$) are detected and quantified by both chemiluminescence and infrared absorbance. The $NO_x$ reduction is presumably due to increased $N_2$, since the amount of $N_2O$ and any other oxides of nitrogen, like $HONO_2$, is negligible compared to the reduction in $NO_x$ concentration. The maximum $NO_x$ reduction shown in FIG. 4 can be increased by increasing the amount of additive diesel fuel, increasing the catalyst amount and/or decreasing the exhaust gas flow rate.

In the eight experiments (data summarized in FIG. 4) that are conducted in view of the scheme of FIG. 3 (four with and four without plasma assistance), the incoming engine-exhaust gas is at a temperature of about 260° C. The propylene reductant, which provides 3000 ppm ($C_1$), is initially injected in each experiment through inlet 54 to the $NO_x$-containing gas exhaust stream inletted through inlet 56 in chamber 66. After passing through the respective SCR catalysts in catalytic converter 78 in each experiment, less than about 20% of the $NO_x$ is reduced at the 260 degree C. temperature while consistently higher $NO_x$ reductions are observed for each catalyst when initial plasma assistance is provided. The highest total $NO_x$ reduction at the 260 degree C. temperature is achieved after passing through the catalytic converter when the catalyst comprises the gamma alumina, and the zeolites provide lower amounts of $NO_x$ reduction. The data obtained at 260 degrees exhibits comparatively high $NO_x$ reduction in the presence of the conventional gamma alumina catalyst.

Figure 5:
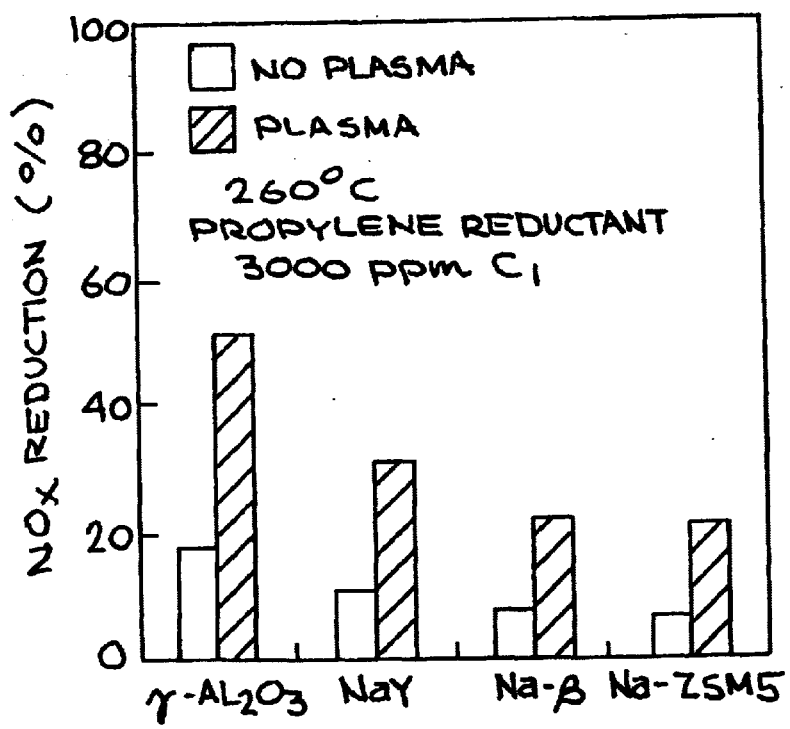
FIG. 5 is a bar graph illustrating the percentage of $NO_x$ reduction in a diesel engine exhaust by catalysts containing gamma-alumina, sodium Y-zeolite, sodium beta-zeolite or sodium ZSM5-zeolite and hydrocarbon addition to the exhaust at 260 degrees C., with and without plasma assistance.

In FIG. 5, at incoming exhaust temperatures of 260 degrees C. to a catalytic converter, the percentage of total $NO_x$ reduction in an exhaust from a diesel engine is compared in the presence of four different SCR lean-$NO_x$ catalysts, using an additional portion of proplyene as the reductant. The catalysts contain pellets of pure $\gamma$-$Al_2O_3$, pellets of sodium cation exchanged zeolites, including sodium Y-zeolite, sodium beta-zeolite, and sodium ZSM-5-zeolite. Among the sodium cation exchanged zeolites, the Y-type zeolite exhibits the highest $NO_x$ reduction. But again, the data obtained at 260 degrees exhibits comparatively high $NO_x$ reduction in the presence of the conventional gamma alumina catalyst.

However, a startling discovery of the invention is observed when the above experiment is run at less than about 250 degrees C., e.g., at about 200 degrees C. The high-surface-area, large-pore, basic zeolite-containing catalysts provide greater $NO_x$ reduction activity than the conventional alumina catalysts at a lower exhaust (and conversion) temperature. Furthermore, at the relatively low temperatures, the basic, large pore zeolite-containing catalysts.are able to provide such activity in the presence of a heavier hydrocarbon reductant than the propylene employed with gamma-alumina at 260 C.

Figure 6:
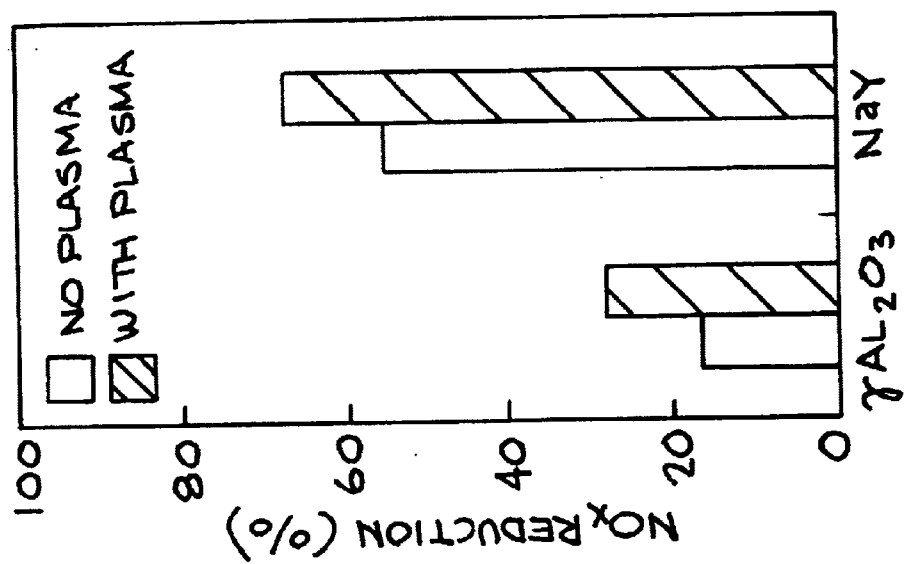
FIG. 6 is a bar graph illustrating the percentage of $NO_x$ reduction in a diesel engine exhaust by catalysts containing gamma-alumina or sodium Y-zeolite and hydrocarbon addition to the exhaust at 200 degrees C., with and without plasma assistance.

Such a surprising effect can be applied to diesel engine $NO_x$ reduction control, particularly since the exhaust temperatures of the experiments are relatively low, yet within the range of typical industrial diesel exhaust temperatures and the additive hydrocarbon reductant concentrations indicate greater than 50% $NO_x$ reduction with less than a 5% fuel penalty for the overall combustion system. For instance (as data summarized in FIG. 6), at an exhaust temperature of 200 degrees C. and about 2,500 ppm ($C_1$) of additive kerosene provides activity with the gamma alumina catalyst that effects less than 20% (and with plasma assistance less than 30%) $NO_x$ reduction. In the invention, at the same 200 degree C. temperature and 2,500 ppm ($C_1$) additive kerosene concentration provides activity with the basic large-pore zeolite-containing catalyst (as shown in FIG. 6) that effects greater than 50% (and with plasma assistance greater than 60%) $NO_x$ reduction. A 2,500 ppm ($C_1$) additive kerosene or diesel fuel concentration is only about a 2.2% fuel penalty. Furthermore, such a $NO_x$ reduction improvement from about 10% (and with plasma assistance about 30%) $NO_x$ reduction with the basic zeolite-containing catalyst is clearly unpredicted and unexpected. Accordingly, even at such a low exhaust temperature as 200 degrees C, the results illustrated in FIG. 6 clearly suggest that relatively high percentages of $NO_x$ reduction can be achieved at concentrations of less than (or equal to) 3000 ppm ($C_1$) additive hydrocarbon, and even in concentrations greater than 3000 ppm ($C_1$) that are still less than a 5% fuel penalty.

Zeolites are crystalline aluminosilicate materials. The range of silicon-to-aluminum ratio varies a great deal between different zeolites. For example, the ZSM-5 zeolite can only tolerate low levels of aluminum substitution, the smallest silicon-to-aluminum ratio being around 10. Faujasite-type zeolites, such as X-zeolite and Y-zeolite can accommodate much higher levels of aluminum substitution and accordingly have ratios less than 10. FIG. 5 illustrates that, for the same type of cation (in this case sodium), the higher aluminum content provides a relatively higher percentage of $NO_x$ reduction. The incorporation of aluminum into the zeolite structure has two major consequences. First, the replacement of silicon by aluminum results in a net negative charge for the zeolite framework. The basic sites are described as oxygen anion bound to aluminum cation, $AlO_4^-$. The negative charge of the site $AlO_4^-$ is neutralized by monovalent (e.g. $Na^+$, $K^+$), divalent (e.g. $Ca^{2+}$, $Sr^{2+}$) or trivalent (e.g. $La^{3+}$) cations. FIG. 4 illustrates that the monovalent cations from the alkali metal ion series (e.g. sodium) provides a relatively higher percentage of $NO_x$ reduction compared to the divalent cations from the alkaline earth metal ion series (e.g. calcium). The basic strength of the $AlO_4^-$ sites may be correlated to the ionic radius of the monovalent cation, i.e., LiY<NaY<KY<RbY<CsY. The basic strength may also increase by increasing the silicon-to-aluminum ratio of the zeolite. The X-zeolite and the Y-zeolite are synthetic counterparts of the naturally occurring mineral faujasite., i.e., faujasite-type zeolites. Zeolites X and Y have the same framework structure but different silicon-to-aluminum ratios than natural faujasite. By convention, the zeolite is labeled X if the silicon-to-aluminum ratio is greater than or equal to 1 and less than 1.5, and labeled Y if the silicon-to-aluminum ratio is greater than or equal to 1.5 and less than 3. The second consequence of the inclusion of aluminum in the zeolite framework is that the material becomes hydrophilic.

The most preferred pore size diameter of about 7.5 angstroms in the zeolite employed in the invention is an important parameter that determines the variety of organic and inorganic molecules than can be absorbed by the zeolite. Molecules can be absorbed provided their dimensions are comparable with those of the pore size. For increased reactivity with the large molecules present in heavy hydrocarbons in diesel, the relatively large pore size is preferred. In addition to having high surface area, the X-zeolite and Y-zeolite have the largest pore sizes, typically about 7.5 angstroms in diameter, among the zeolites. The remarkably stable and rigid framework structure of the X and Y zeolites also contains the largest void space of any known zeolite and amounts to greater than 40, and even greater than about 50 volume percent of the crystal.

Figure 7:
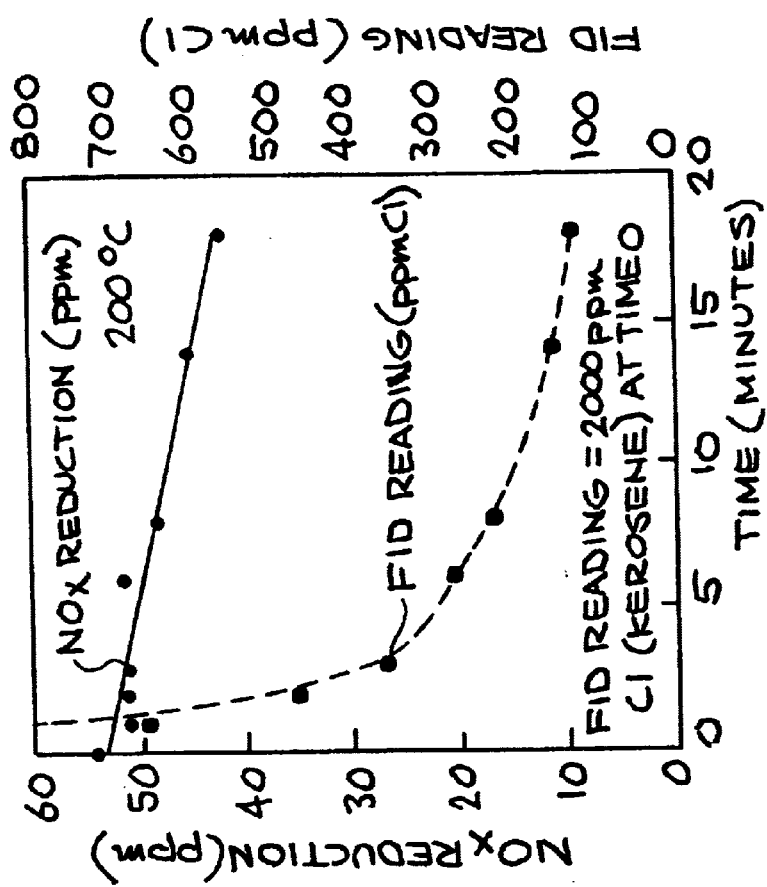
FIG. 7 is a plot graph of the amount of $NO_x$ reduced as a function of time, where a catalyst has been exposed to hydrocarbon injection prior to time zero and the hydrocarbon injection is stopped at time zero.

In one embodiment illustrating the present invention in view of the block diagram of FIG. 1, an engine exhaust 14a is treated for $NO_x$ reduction in the presence of a basic large-pore zeolite-containing SCR catalyst in $NO_x$ reduction unit 16. An initial concentration of 2000 ppm $C_1$ of kerosene hydrocarbon vapor from a periodic pulse controller (i.e., a gas flow controller adapted to periodically or intermittently inject gas or the like) is injected into $NO_x$ reduction unit 16 from, through, or within, for example, fuel tank bleed line 15 to reduce $NO_x$ by 55 ppm. Such a pulse of hydrocarbon vapor injected for approximately 5 minutes is then stopped for 25 minutes; however, $NO_x$ reduction continues to occur as the hydrocarbon vapor concentration falls to less than 300 ppm in about the first 5 minutes of stoppage. Although the $NO_x$ reduction declines over about the entire 25 minutes of stoppage from 55 ppm $NO_x$ reduction to a 40 ppm $NO_x$ reduction, nevertheless the $NO_x$ species continues to be removed (reduced) from the exhaust stream even though the hydrocarbon level is essentially negligible (e.g., less than 100 ppm) over the stopped-pulse period (e.g., about 25 minutes). Such a treatment indicates that $NO_x$ removal can be achieved essentially in the absence or minimus of added hydrocarbon vapor, particularly under suitable catalytic $NO_x$ reduction conditions including employment of the basic, large pore faujasite-type catalyst. FIG. 7 exhibits a summary of the data for such an embodiment for the single hydrocarbon pulse and single stop.

Changes and modifications in the specifically described embodiments can be carried out without departing from the scope of the invention which is intended to be limited only by the scope of the claims.

We claim:

1. A method for reducing nitrogen oxides ($NO_x$) in exhausts from high-temperature combustion of an engine, the method comprising the steps of:
    adding hydrocarbons to an engine exhaust comprising $NO_x$ to produce a hydrocarbon-containing engine exhaust, wherein at least a portion of said $NO_x$ is converted to $NO_2$ in the presence of a non-thermal plasma; and converting $NO_x$ in the hydrocarbon-containing engine exhaust with a selective catalytic reduction (SCR) catalyst comprising a basic, large-pore zeolite, to a gas flow including $N_2$ and $O_2$.

2. The method defined in claim 1 wherein said hydrocarbons boil in the range from about 150 degrees C. to about 450 degrees C. and said converting occurs at a temperature less than about 250 degrees C.

3. The method defined in claim 2 wherein said catalyst comprises a fully exchanged alkali metal cation Y-zeolite.

4. The method of claim 2 wherein said zeolite comprises a pore volume above about 0.20 ml/gram.

5. The method of claim 2 wherein said zeolite comprises a pore volume above about 0.30 ml/gram.

6. The method of claim 2 wherein said zeolite comprises a pore size greater than about 6.5 angstroms.

7. The method of claim 2 wherein said zeolite comprises a silicon/aluminum ratio in the range of about 1 to about 3.

8. The method of claim 1 wherein, said basic zeolite comprises alkali metal cation-exchanged faujasite-type zeolite catalyst.

9. A method for reducing $NO_x$ in an oxygen-rich diesel engine exhaust, said method comprising:
    injecting a diesel fuel into said diesel engine exhaust to produce a mixture containing said diesel engine exhaust and said diesel fuel, said diesel fuel in a concentration above 500 ppm C1; and contacting a selective catalytic reduction (SCR) catalyst comprising a large-pore, basic zeolite with said mixture at a temperature less than about 250 degrees C. to reduce said $NO_x$ contained in said diesel engine exhaust, wherein at least a portion of said $NO_x$ is converted to $NO_2$ in the presence of a non-thermal.

10. The method of claim 9 wherein said temperature is in the range from about 150 degrees C. to about 225 degrees C.

11. The method of claim 10 wherein said basic zeolite comprises a Y-zeolite and at least 50% of said $NO_x$ is reduced.

12. The method of claim 9 wherein injecting said diesel fuel into said exhaust results in said mixture containing diesel fuel in a concentration greater than 1000 ppm C1 at a temperature below about 210 degrees C.

13. The method of claim 12 wherein said concentration of diesel fuel in said mixture comprises less than 10% of a diesel fuel requirement that initially produces said diesel engine exhaust prior to said injecting.

14. The method of claim 9 wherein said SCR catalyst comprises an alkali metal cation-exchanged faujasite-type zeolite catalyst.

15. The method of claim 9 wherein after contacting said mixture with said SCR catalyst comprising a sodium or potassium Y-zeolite, an unconverted portion of said diesel fuel contained in said mixture is subsequently oxidized to $CO_2$ and $H_2O$ in the presence of an oxidation catalyst.

16. The method of claim 9 further comprising intermittently injecting said diesel fuel into said diesel engine exhaust.

17. A method for reducing nitrogen oxides ($NO_x$) in oxygen-rich exhausts from combustion, the method comprising the steps of:
    intermittently adding diesel fuel which has a boiling point in the range from about 150 degrees C. to about 450 degrees C. to an engine exhaust comprising $NO_x$ to produce a diesel fuel-containing engine exhaust; and converting $NO_x$ in the engine exhaust in the absence of added diesel fuel at a temperature less than about 250 degrees C., with a selective catalytic reduction (SCR) catalyst comprising an alkali metal cation exchanged faujasite-type zeolite, to a gas flow including $N_2$, $CO_2$ and $H_2O$.

18. The method of claim 17 wherein said gas flow comprises an unconverted portion of said diesel fuel and said unconverted portion is subsequently oxidized to $CO_2$ and $H_2O$.

19. The method of claim 17 wherein at least a portion of said $NO_x$ is converted to $NO_2$ in the presence of a non-thermal plasma and $NO_2$ is converted to $N_2$ and $O_2$ in the presence of said basic zeolite.

20. The method of claim 17 wherein said basic zeolite comprises an alkali metal cation exchanged zeolite, said zeolite selected from the group consisting of X-zeolite and Y-zeolite.

* * * * *